US009086150B2

(12) United States Patent
Bian et al.

(10) Patent No.: US 9,086,150 B2
(45) Date of Patent: Jul. 21, 2015

(54) ELASTOMERIC SHAFT SEAL FORMED WITHOUT OVEN POST CURING

(71) Applicants: Junfeng Bian, Ann Arbor, MI (US); Roger Holliday, Ann Arbor, MI (US); Bhawani Tripathy, Ann Arbor, MI (US)

(72) Inventors: Junfeng Bian, Ann Arbor, MI (US); Roger Holliday, Ann Arbor, MI (US); Bhawani Tripathy, Ann Arbor, MI (US)

(73) Assignee: Federal-Mogul Corporation, Southfield, MI (US)

( * ) Notice: Subject to any disclaimer, the term of this patent is extended or adjusted under 35 U.S.C. 154(b) by 0 days.

(21) Appl. No.: 13/748,752

(22) Filed: Jan. 24, 2013

(65) Prior Publication Data
US 2014/0203518 A1 Jul. 24, 2014

(51) Int. Cl.
*B29C 45/14* (2006.01)
*F16J 15/16* (2006.01)
*B29C 65/40* (2006.01)
*B32B 15/082* (2006.01)
*F16J 15/12* (2006.01)
*B29D 99/00* (2010.01)

(52) U.S. Cl.
CPC .............. *F16J 15/16* (2013.01); *B29C 65/405* (2013.01); *B29D 99/0085* (2013.01); *B32B 15/082* (2013.01); *F16J 15/12* (2013.01); *F16J 15/121* (2013.01); *B29K 2827/12* (2013.01)

(58) Field of Classification Search
USPC .............. 264/259–263, 265, 267–269, 271.1, 264/274, 279, 279.1, 35
See application file for complete search history.

(56) References Cited

U.S. PATENT DOCUMENTS

| 3,634,309 A | 1/1972 | Palumbo |
| 3,879,044 A | 4/1975 | Estes |
| 3,903,045 A | 9/1975 | Chandrasekaran et al. |
| 3,933,732 A | 1/1976 | Schmiegel |
| 4,123,603 A | 10/1978 | Stewart, Jr. |
| 4,985,520 A | 1/1991 | Hayashi et al. |
| 4,986,511 A | 1/1991 | Irby et al. |
| 5,269,539 A | 12/1993 | Martin |
| 6,921,796 B2 | 7/2005 | Hetherington |

(Continued)

FOREIGN PATENT DOCUMENTS

| EP | 1400563 A1 | 3/2004 |
| EP | 1566582 A1 | 8/2005 |

(Continued)

OTHER PUBLICATIONS

International search report mailed Apr. 28, 2014 (PCT/US2014/012160).

*Primary Examiner* — Stella Yi
(74) *Attorney, Agent, or Firm* — Robert L. Stearns; Dickinson Wright, PLLC

(57) ABSTRACT

An elastomeric seal (20), such as a shaft seal for automotive vehicle applications, includes an elastomeric compound (22) chemically coupled to a metal sealing ring (24) and is formed without an oven post curing step. The elastomeric seal (20) provides exceptional physical properties, similar to those of elastomeric seals of the prior art formed with an oven post curing step. The elastomeric seal (20) has an elastic modulus of 6.0 MPa to 13.0 MPa and a tensile strength of 11.1 MPa to 14.8 MPa. The elastomeric compound (22) includes 52.0 to 68.0 wt. % fluoroelastomer, 20.0 to 35.0 wt. % calcium silicate, and 5.0 to 15.0 wt. % diatomite. The elastomeric compound (22) is fully cured and chemically coupled to the metal sealing ring (24) during the compression or injection molding step, and thus an oven post curing step is not required.

13 Claims, 1 Drawing Sheet

(56) References Cited

U.S. PATENT DOCUMENTS

| | | |
|---|---|---|
| 7,055,828 B2 | 6/2006 | Hatch et al. |
| 7,135,527 B2 | 11/2006 | Park |
| 7,138,470 B2 | 11/2006 | Fukushi et al. |
| 7,244,789 B2 | 7/2007 | Hetherington |
| 7,449,524 B2 | 11/2008 | Park et al. |
| 2004/0024133 A1 | 2/2004 | Hetherington |
| 2005/0137352 A1 | 6/2005 | Hetherington |
| 2005/0181261 A1 | 8/2005 | Yuan et al. |
| 2006/0293439 A1 | 12/2006 | Hetherington |
| 2008/0193826 A1 | 8/2008 | Yuan et al. |
| 2011/0143124 A1 | 6/2011 | Yokota |
| 2011/0168015 A1 | 7/2011 | Holliday, Jr. |
| 2012/0100379 A1 | 4/2012 | Luo |

FOREIGN PATENT DOCUMENTS

| | | |
|---|---|---|
| EP | 2258767 A1 | 12/2010 |
| EP | 2503200 A1 | 9/2012 |
| EP | 2540494 A1 | 1/2013 |
| JP | 2006218629 A | 8/2006 |
| WO | 0148077 A2 | 7/2001 |

ELASTOMERIC SHAFT SEAL FORMED WITHOUT OVEN POST CURING

BACKGROUND OF THE INVENTION

1. Field of the Invention

This invention relates to elastomeric seals, such as shaft seals for automotive vehicle applications, and methods of forming the elastomeric seals.

2. Related Art

Elastomeric seals, such as shaft seals for automotive vehicle applications, typically include an elastomeric compound chemically coupled to a metal sealing ring. The elastomeric compound can include a variety of elastomers, polymers, and fillers, such as polyacrylates, ethylene acrylic, and fluoroelastomers. Examples of such elastomeric seals are provided by Federal-Mogul Corporation.

The elastomeric seals of the prior art are formed by molding the elastomeric compound to the metal sealing ring, and then oven post curing the elastomeric seal after the molding step to fully cure and chemically couple the elastomeric compound to the metal sealing ring. The conditions of the oven post curing step vary depending on the type of elastomeric compound, and the thickness and geometry of the elastomeric compound. Typically, the oven post curing step is conducted in an oven at a minimum temperature of 170° C. and for a time period of one hour to 24 hours, or more. Thus, the oven post curing step involves significant capital investment, labor costs, energy consumption, and other burdens on a manufacturer of the elastomeric seals.

SUMMARY OF THE INVENTION

One aspect of the invention provides a method of forming an elastomeric seal. The method includes molding an elastomeric compound to a sealing ring. The elastomeric compound includes, in wt. % of the elastomeric compound, 52.0 to 68.0 wt. % fluoroelastomer, and the sealing ring includes a metal material. The method also includes chemically coupling the elastomeric compound to the sealing ring during the molding step and without an oven post curing step after the molding step.

Another aspect of the invention provides an elastomeric seal comprising a sealing ring and an elastomeric compound. The sealing ring includes a metal material and presents a plurality of surfaces extending around a center axis, and the elastomeric compound is chemically coupled to at least one of the surfaces. The elastomeric compound includes, in wt. % of the elastomeric compound, 52.0 to 68.0 wt. % fluoroelastomer. Further, the elastomeric seal is produced by a process comprising the steps of: molding the elastomeric compound to the sealing ring, and chemically coupling the elastomeric compound to the sealing ring, wherein the chemically coupling step occurs during the molding step and without an oven post curing step after the molding step.

By eliminating the oven post curing step, the invention eliminates capital investment in oven post curing equipment, labor costs of performing the oven post curing step, and energy costs of heating the elastomeric seal during the oven post curing step. The elastomeric seal also provides exceptional physical properties, including a tensile strength and elastic modulus similar to elastomeric seals of the prior art produced with an oven post curing step.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Figure 1:
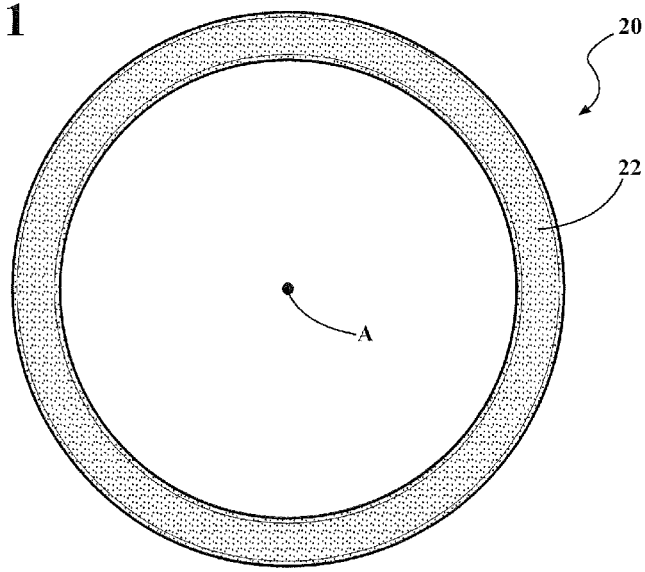
FIG. 1 is a top view of an elastomeric seal according to one embodiment of the invention.
Figure 2:
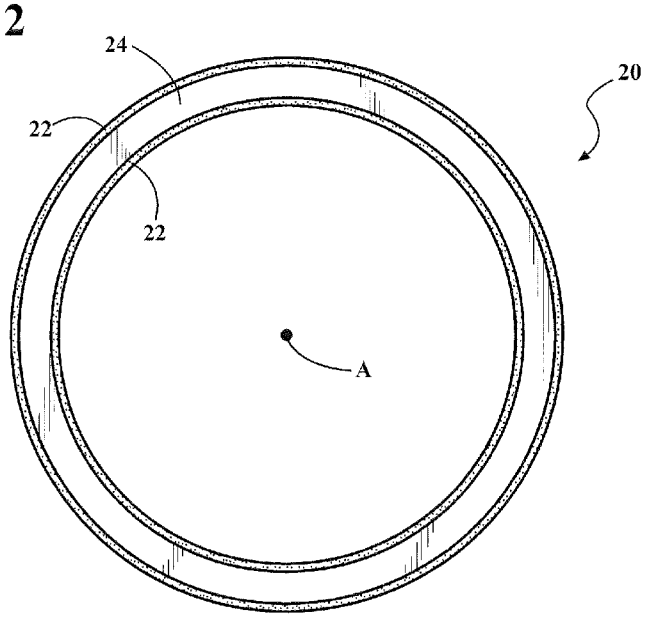
FIG. 2 is a bottom view of the elastomeric seal of FIG. 1.

One aspect of the invention provides a method of forming an elastomeric seal 20, for example the elastomeric seal 20 shown in FIGS. 1 and 2, for sealing and protecting a metal shaft (not shown) of an automotive vehicle application from oil and debris. The elastomeric seal 20 includes an elastomeric compound 22, including a fluoroelastomer (FKM), chemically coupled to a metal sealing ring 24. The method of forming the elastomeric seal 20 includes chemically coupling the elastomeric compound 22 to the metal sealing ring 24 during a molding step and does not require an oven post curing step. By eliminating the oven post curing step, capital investment, labor costs, and energy consumed is significantly reduced, compared to methods of forming elastomeric seals of the prior art requiring an oven post curing step.

The method of forming the elastomeric seal 20 without the oven post curing step first includes providing the elastomeric compound 22. In one preferred embodiment, the elastomeric compound 22 includes, in wt. % of the elastomeric compound 22, 52.0 to 68.0 wt. % FKM. The elastomeric compound includes at least 52.0 wt. % FKM, or not greater than 68.0 wt. % FKM. The FKM is a dipolymer of hexafluoropropylene and vinylidene fluoride. The FKM can be obtained from the followings suppliers: Du Pont, Solvay Solexis, 3M, Daikin, and other FKM suppliers.

The elastomeric compound 22 also includes a plurality of other components in predetermined amounts, allowing the elastomeric seal 20 to be formed without the oven post curing step. In one embodiment, the elastomeric compound 22 includes 20.0 to 35.0 wt. % calcium silicate, or at least 20.0 wt. % calcium silicate, or not greater than 35.0 wt. % calcium silicate. The elastomeric compound 22 also includes 5.0 to 15.0 wt. % diatomite, or at least 5.0 wt. % diatomite, or not greater than 15.0 wt. % diatomite. In one embodiment, the elastomeric compound 22 includes 1.0 to 5.0 wt. % carbon black, or at least 1.0 wt. % carbon black, or not greater than 5.0 wt. % carbon black. The elastomeric compound 22 also typically includes 0.5 to 3.0 wt. % bisphenol AF, which has the IUPAC name 4-[1,1,1,3,3,3-Hexafluoro-2-(4-hydroxyphenyl)propan-2-yl]phenol. The elastomeric compound 22 also typically includes 0.1 to 0.5 wt. % accelerator. The accelerator is a substance that increases the rate of a chemical reaction. Preferred accelerators are onium accelerators, for example 1-chloro-N,N-diethyl-1,1-diphenyl-1-(phenylmethyl)phosphoramine, or benzyltriphenylphosphonium chloride. The elastomeric compound 22 is typically bisphenol cured and contains 0.5-3.0 wt. % bisphenol AF and 0.1-0.5 wt. % onium accelerator.

The elastomeric compound 22 also typically includes metal oxides in predetermined amounts, allowing the elastomeric seal 20 to be formed without the oven post curing step. In one embodiment, the elastomeric compound 22 includes 4.0 to 10.0 wt. % metal oxides, or at least 4.0 wt. % metal oxides, or not greater than 10.0 wt. % metal oxides. For example, the elastomeric compound 22 can include magnesium oxide, calcium oxide, and calcium hydroxide. In this embodiment, the elastomeric compound 22 can include 3.0 to 5.0 wt. % magnesium oxide, 0.5 to 2.0 wt. % calcium oxide, and 0.3 to 3.0 wt. % calcium hydroxide.

The elastomeric compound 22 also typically includes processing aids in predetermined amounts, allowing the elastomeric seal 20 to be formed without the oven post curing step. In one embodiment, the elastomeric compound 22 includes 0.2 to 2.0 wt. % processing aids, or at least 0.2 wt. % processing aids, or not greater than 2.0 wt. % processing aids. In one embodiment, the processing aids include at least one of wax, fatty acid derivatives, organosilicones, fluoropolyether derivatives, and octadecylamine.

The method of providing the elastomeric compound 22 having the composition described above typically includes mixing the components together in a mixer, such as an internal mixer, or an open mill, to form the elastomeric compound 22. The elastomeric compound 22 is then rolled into sheets and prepared for molding to the sealing ring 24. In one embodiment, the sheet of elastomeric compound 22 is cut into ring-shaped preforms. In another embodiment, the elastomer is cut into a plurality of strips.

Another preliminary step of the method includes providing the sealing ring 24. The sealing ring 24 can comprise a variety of different configurations, including any configuration known in the art. The sealing ring 24 presents a top surface and an oppositely facing bottom surface each extending circumferentially around a center axis A. The sealing ring 24 also provides an inner diameter surface facing toward the center axis A and an oppositely facing outer diameter surface. The inner diameter surface and outer diameter surface may extend longitudinally from the top surface to the bottom surface of the sealing ring. The sealing ring 24 is typically formed of a metal material, including any metal material known in the art, such as steel. In one embodiment, the sealing ring 24 is prepared for the molding step by cleaning the surfaces of the sealing ring 24, or by applying a bonding agent or adhesive (not shown) to the sealing ring 24.

The method of forming the elastomeric seal 20 next includes molding the elastomeric compound 22 to the sealing ring 24. This step first includes disposing the elastomeric compound 22 and the sealing ring 24 in a molding apparatus, and disposing the elastomeric compound 22 on the sealing ring 24. In one embodiment, the molding step includes compression molding. In this embodiment, the elastomeric compound 22 is provided as the ring-shaped preform. The thickness of the ring-shaped in the radial and axial direction varies depending on the application, but is typically in the millimeter range. The ring-shaped preform is then disposed on the sealing ring 24 in the compression mold. In another embodiment, the molding step includes injection molding, and the elastomeric compound 22 is provided as the plurality of strips. The thickness of the strips in the radial and axial direction also varies depending on the application, but is typically in the millimeter range. The strips can be injected into the mold and contact the sealing ring 24 in the mold.

As stated above, the method of forming the elastomeric seal 20 without the oven post curing step includes chemically coupling the elastomeric compound 22 to at least one of the surfaces of the sealing ring 24 during the molding step. The chemically coupling step is completed without an oven post curing step after the molding step. The composition of the elastomeric compound 22 and process steps described herein allow formation of the elastomeric seal 20 without the oven post curing step, which eliminates the burdensome capital investment in oven post curing equipment, labor costs of performing the oven post curing step, and energy costs of heating ovens to high temperatures during the oven post curing step.

The temperature, pressure, and cure time of the elastomeric compound 22 and sealing ring 24 in the molding apparatus varies depending on the geometry and thickness of the elastomeric compound 22. In one embodiment, such as when the elastomeric compound 22 is provided as the ring-shape preform or the strips, the method includes heating the elastomeric compound 22 to a temperature of at least 175° C. for at least 3 minutes. The pressure and temperature applied to the elastomeric compound 22 chemically couples the elastomeric compound 22 to the sealing ring 24, and thus there is no need for the oven post curing step. In other words, the elastomeric compound 22 is fully cured during the molding step, in the molding apparatus. Once the elastomeric seal 20 is removed from the molding apparatus, no oven post curing is required.

The chemically coupling step, which occurs while molding the elastomeric compound 22 to the sealing ring 24, provides the elastomeric seal 20 with exceptional physical properties, such as physical properties comparable to those of other elastomeric seals formed by prior art methods including an oven post curing step. The elastomeric compound 22 typically provides a cohesive failure, which means the bond between the elastomeric compound 22 and the sealing ring 24 fails at the elastomeric compound 22 during a peel test. Thus, the bond between the elastomeric compound 22 and sealing ring 24 is stronger than the elastomeric compound 22.

During the molding step, the elastomeric compound 22 can be formed into a variety of different shapes around the sealing ring 24. In the embodiment of FIGS. 1 and 2, the elastomeric compound 22 extends circumferentially around the center axis A and covers the inner diameter surface, outer diameter surface, and top surface of the sealing ring 24. The top surface of the sealing ring 24 is completely covered by the elastomeric compound 22, while the bottom surface is uncovered and is exposed to the surrounding environment. The elastomeric seal 20 is designed such that during operating in an automotive vehicle application, the elastomeric compound 22 along the inner diameter surface engages a shaft (not shown) of the vehicle application and thus protects the shaft from oil and debris.

Once the elastomeric seal 20 is chemically coupled to the sealing ring 24 in the molding apparatus, the elastomeric seal 20 is removed from the molding apparatus. Since the desirable physical properties were achieved during the molding step, there is no need for an oven post curing step after the molding step. Thus, once the elastomeric seal 20 is removed from the molding apparatus, the method includes maintaining the elastomeric seal 20 at a temperature less than 100° C., preferably less than 40° C., and most preferably at ambient temperature.

Oven post curing of elastomeric seals of the prior art typically includes disposing the elastomeric seal in an oven, and then heating the elastomeric seal to a temperature of at least 170° C. for a time period of one hour to 24 hours, or more. In methods of the prior art, this oven post curing step is done after removing the elastomeric seal from the molding apparatus and is necessary to chemically couple the elastomeric compound to the sealing ring. The oven post curing step of the prior art is also needed to fully cure the elastomeric compound so that the elastomeric compound achieves desirable physical properties, such as a predetermined tensile strength and elastic modulus. As stated above, forming the elastomeric seal 20 without the oven post curing step reduces equipment and labor costs, as well as energy consumption, compared to methods of the prior art including the oven post curing step. Since no post cure step is required, the elastomeric seal 20 can be packaged for shipping and sale right after the molding and trimming steps. No post curing ovens are needed, and no labor is required to move the elastomeric seal 20 into and out of the ovens.

Another aspect of the invention provides the elastomeric seal 20 formed according to the process described above, without the oven post curing step. The elastomeric compound 22 of the finished elastomeric seal 20 is chemically coupled to the metal sealing ring 24 and includes 52 to 68.0 wt. % FKM, 20.0 to 35.0 wt. % calcium silicate, 5.0 to 15.0 wt. % diatomite, 1.0 to 5.0 wt. % carbon black, 3.0 to 5.0 wt. % magnesium oxide, 0.5 to 2.0 wt. % calcium oxide, 0.3 to 3.0 wt. % calcium hydroxide, 0.5 to 3.0 wt. % bisphenol AF, 0.1 to 0.5 wt. accelerator, and 0.2 to 2.0 wt. % processing aids, wherein the processing aids include at least one of wax, fatty acid derivatives, organosilicones, fluoropolyether derivatives, and octadecylamine.

The elastomeric compound 22 of the finished elastomeric seal 20 also has a modulus sufficient for use of the elastomeric seal 20 as a shaft seal of an automotive vehicle application, for example to seal crankshafts or camshafts. In one embodiment, the elastomeric compound 22 has an elastic modulus of 6.0 MPa to 13 MPa, preferably at least 7.5 MPa, when tested according to ASTM D412. In addition, the tensile strength of the elastomeric compound 22 is from 11.1 MPa to 14.8 MPa, when tested according to ASTM D412. During use of the elastomeric seal 20 as a shaft seal of a typical automotive vehicle application, a portion of the elastomeric compound 22 is pressed against the shaft and prevents oil and debris from contacting the shaft to improve vehicle performance.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. In addition, the reference numerals in the claims are merely for convenience and are not to be read in any way as limiting.

What is claimed is:

1. A method of forming an elastomeric seal, comprising the steps of:
    molding an elastomeric compound to a sealing ring, wherein the elastomeric compound includes, in wt. % of the elastomeric compound, 52.0 to 68.0 wt. % fluoroelastomer, wherein the fluoroelastomer is FKM, 20.0 to 35.0 wt. % calcium silicate, 5.0 to 15.0 wt. % diatomite, 1.0 to 5.0 wt. % carbon black, 4.0 to 10.0 wt. % metal oxides, 0.5 to 3.0 wt.% bisphenol AF, 0.1 to 0.5 wt. % accelerator, and at least 0.2 wt. % processing aids, and wherein the elastomeric compound has a tensile strength of 11.1 MPa to 14.8 MPa, and wherein the sealing ring includes a metal material; and
    chemically coupling the elastomeric compound to the sealing ring during the molding step and without an oven post curing step after the molding step.

2. The method of claim 1, wherein the elastomeric compound has an elastic modulus of at least 6.0 MPa.

3. The method of claim 1, wherein the elastomeric compound is provided as a ring prior to the molding step, and wherein the molding step includes heating the elastomeric compound to a temperature of at least 175° C. for at least 3 minutes.

4. The method of claim 1, wherein the elastomeric compound is provided as a plurality of strips prior to the molding step, and wherein the molding step includes heating the elastomeric compound to a temperature of at least 175° C. for at least 3 minutes.

5. The method of claim 1, wherein the molding step includes disposing the elastomeric compound and sealing ring in a molding apparatus, and further comprising the steps of removing the elastomeric compound from the molding apparatus after the molding step and maintaining the elastomeric compound at a temperature less than 100° C. after the molding step.

6. The method of claim 5, wherein the method does not include heating the elastomeric compound to a temperature of at least 170° C. for at least one hour after removing the elastomeric compound from the molding apparatus.

7. The method of claim 1, wherein the oven post curing step would include heating the elastomeric compound to a temperature of at least 170° C. for at least one hour.

8. The method of claim 1, wherein the elastomeric compound includes not greater than 2.0 wt. % processing aids.

9. A method of forming an elastomeric seal, comprising the steps of:
    providing an elastomeric compound;
    the step of providing the elastomeric compound including mixing components, wherein the components include, in wt. % of the total mixture of components, 52.0 to 68.0 wt. % fluoroelastomer, wherein the fluoroelastomer is FKM, 20.0 to 35.0 wt. % calcium silicate, 5.0 to 15.0 wt. % diatomite, 1.0 to 5.0 wt. % carbon black, 4.0 to 10.0 wt. % metal oxides, 0.5 to 3.0 wt. % bisphenol AF, 0.1 to 0.5 wt.% accelerator, and 0.2to 2.0 wt. % processing aids;
    providing a sealing ring including a plurality of surfaces extending circumferentially around a center axis;
    cleaning the surfaces of the sealing ring;
    disposing the elastomeric compound on the sealing ring;
    disposing the elastomeric compound and sealing ring in a molding apparatus, wherein the molding apparatus is an injection mold or a compression mold;
    molding the elastomeric compound to the sealing ring in the molding apparatus to form an elastomeric seal;
    the molding step including chemically coupling the elastomeric compound to at least one of the plurality of surfaces of the sealing ring;
    the molding step including heating the elastomeric compound to a temperature of 175° C. for at least 3 minutes and applying a pressure to the elastomeric compound while the elastomeric compound is disposed in the molding apparatus;
    chemically coupling the elastomeric compound to the sealing ring during the molding step;
    the chemically coupling step including providing the elastomeric compound with a tensile strength of 11.1 MPa to 14.8 MPa when tested according to ASTM D412;
    the chemically coupling step including providing the elastomeric compound with an elastic modulus of 6.0 MPa to 10.0 MPa when tested according to ASTM D412;
    removing the elastomeric seal from the molding apparatus after the molding step;
    maintaining the elastomeric seal at ambient temperature after removing the elastomeric seal from the molding apparatus; and
    the chemically coupling step being performed without an oven post curing step after removing the elastomeric seal from the molding apparatus, wherein the oven post curing step would include heating the elastomeric seal to a temperature of at least 170° C. for at least one hour in an oven after removing the elastomeric seal from the molding apparatus.

10. The method of claim 1, wherein the accelerator of the elastomeric compound includes an onium accelerator selected from the group consisting of: 1-chloro-N,N-diethyl-1,1-diphenyl-1-(phenylmethyl)phosphoramine and benzyltriphenylphosphonium chloride.

11. The method of claim 10, wherein the metal oxides of the elastomeric compound include, in wt. % of the elastomeric compound, 3.0 to 5.0 wt. % magnesium oxide, 0.5 to 2.0 wt. % calcium oxide, and 0.3 to 3.0 wt. % calcium hydroxide.

12. The method of claim 11, wherein the processing aids of the elastomeric compound include at least one of wax, fatty acid derivatives, organosilicones, fluoropolyether derivatives, and octadecylamine.

13. The method of claim 1, wherein the FKM is a dipolymer of hexafluoropropylene and vinylidene fluoride.

\* \* \* \* \*